Jan. 23, 1951     C. O. GORDON ET AL     2,539,072

JOURNAL BEARING

Filed March 31, 1947

INVENTORS:-
CECIL O. GORDON
HARRY W. TASH
HENRY HAFFNER
RUPERT FRANKLIN

BY

*Huebner, Maltby & Bechler*

ATTORNEYS

Patented Jan. 23, 1951

2,539,072

UNITED STATES PATENT OFFICE 2,539,072

JOURNAL BEARING

Cecil O. Gordon, Harry W. Tash, and Rupert Franklin, Fresno, and Henry Haffner, Los Angeles, Calif.; said Franklin assignor to said Gordon Application March 31, 1947, Serial No. 738,254

2 Claims. (Cl. 308—240)

The present invention relates to journal bearings and more particularly to such bearings adapted to be lubricated from a source of lubricant under pressure.

As has been well known, bearing failure is commonly due to two malefic and concurrent influences. Hammering effect of a shaft journaled in the bearing tends to damage the material of the bearing and actually extrude it from its proper configuration. This is particularly true in bearings of soft material and is exemplified in automobile connecting rod bearings. Further, frictional heat in many instances becomes excessive and serves to soften the bearing material and make it particularly susceptible to extrusion. The connecting rod bearings of Diesel engines are subjected to conditions illustrative of these influences in aggravated form and are conventionally of notoriously short life.

Such bearings, as heretofore constructed, have provided lubricating channels of various configuration. Channels inwardly disposed bearings and circumscribing shafts journaled in the bearings in planes at right angles to the longitudinal axis of the shafts have been found objectionable because, as the shafts are worn by the bearings, circumscribing radial projections are left on the shafts by the channels. When such circumscribing channels are angularly displaced from right angular relation to the longitudinal axis of the shafts, the bearing material at the edges of the channels is sharpened by wear and exercises a shaving effect on the shafts journaled in the bearing. In short, channels formed inwardly disposed bearings and in circumscribing relation to shafts journaled in the bearings are generally unsatisfactory. Channels formed in bearings parallel to the longitudinal axis thereof have been found superior to circumscribing channels but tend to become clogged. At least one bearing has been designed to overcome this clogging by providing lubricant discharge openings near the ends of longitudinal channels in the bearing. This has been found successful in precluding the objectionable clogging of the channels but precludes the building up of desirable lubricant pressure successfully to provide a film of lubricant coextensive with the frictional surfaces.

An object of our invention is to provide an improved journal bearing of increased durability.

Another object is to provide a bearing effectively withstanding weights and inertia of members journaled therein.

Another object is to provide improved lubricant distribution systems in journal bearings resisting clogging, minimizing wear, and enabling the maintenance of desired lubricating pressure.

Further objects are to provide improved configurations and arrangements of lubrication channels in a simple and economical bearing of the character and for the purposes set forth.

Referring more in detail to the drawings.

Figure 1:
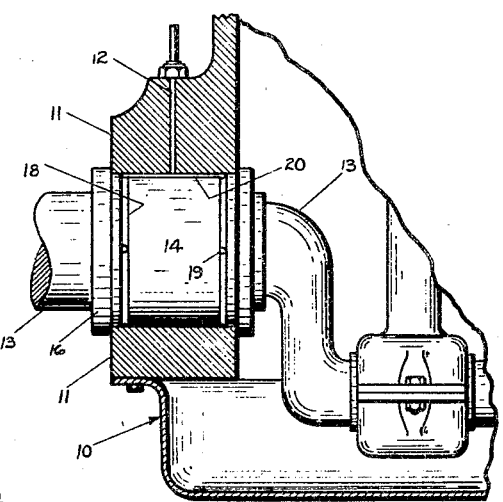
Fig. 1 is a fragmentary section of an engine illustrating a use of a bearing of the present invention as a main bearing in an engine.
Figure 2:
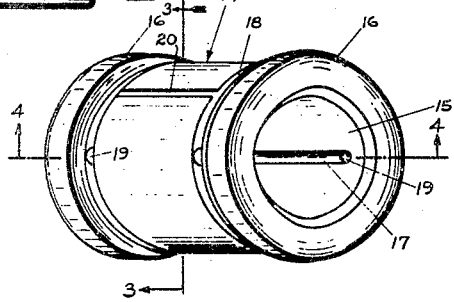
Fig. 2 is a perspective view of a bearing of the present invention.

Referring in greater detail to the drawing:

A fragmentary section of an engine, such as a Diesel engine, is indicated generally at 10. A pillow block 11 having a lubricant supply conduit 12 is indicated as a part of the engine and serves as a mounting for a bearing of the present invention, presently more fully described which functions as a main bearing in the engine. A crankshaft 13 is shown journaled in the bearing. The conventional elements referred to merely provide a convenient illustration of the employment of a bearing of the present invention; said bearing being in no way limited to such elements or associations.

The improved bearing comprises a substantially cylindrical member, or bushing, 14 having a coaxial cylindrical opening, or bore, 15 formed therein. The cylindrical member is tubular in form and has a pair of radial projections 16 of limited circumferential extent at each end thereof. The radial projections, in association with the pillow block 11, serve to maintain the bearing in operable position in the engine.

Figure 3:
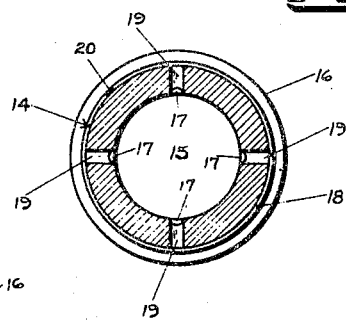
Fig. 3 is a section taken on line 3—3 of Fig. 2.
Figure 4:
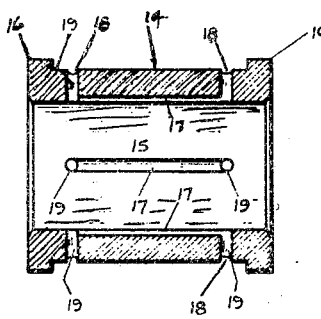
Fig. 4 is a section taken on line 4—4 of Fig. 2.

Longitudinal grooves or channels 17 are formed in the tubular member inwardly disposed the opening 15. The grooves 17 are substantially parallel to the longitudinal axis of the shaft 13 journaled in the bearing. Said grooves are preferably formed intermediate the ends of the tubular member. As shown in Fig. 3, the longitudinal grooves are preferably equally spaced around the inwardly disposed surface of the tubular member.

Endless circumferential grooves 18 are formed in the periphery of the tubular member, preferably lying in planes substantially at right angles to the longitudinal axis of the bearing, and are positioned between the radial projections 16 where they are over-laid by the pillow block 11 in which the bearing is mounted. Openings or apertures 19 communicate between the ends of the inwardly disposed longitudinal grooves 17 and the outwardly disposed circumferential grooves 18.

To conduct lubricant from the conduit 12 to the circumferential groove 18 and thence to the apertures 19, and the longitudinal grooves 17; additional outwardly disposed grooves 20 are formed in the tubular member so as to register with the conduit when the bearing is mounted in the pillow block and to communicate with each of the circumferential grooves 18.

Operation

The operation of the bearing is apparent from the preceding description and will be summarized briefly at this point. The bearing is mounted in a pillow block or other maintaining apparatus in the usual manner, care being exercised to cause the groove 20 to register with the conduit 12 so that lubricant from a source thereof under pressure may be introduced to the bearing. Although the bearing is illustrated as a single piece bearing, it will be clearly apparent that said bearing may be longitudinally bisected into bearing halves, as for use on connecting rods or further divided as convenience suggests.

So mounted, lubricant is forced through the conduit, passes through the grooves 20 and the circumferential grooves 18 that are over-laid by the pillow block 11, through the apertures 19, and into the longitudinal grooves 17 which serve to distribute the lubricant over the frictional surfaces. The introduction of lubricant to the ends of the longitudinal groove 17 precludes clogging of the ends thereof as is normally experienced in bearings that are longitudinally grooved. The introduction of the lubricant at the ends of the grooves further serves more expeditiously to distribute said lubricant over the frictional surfaces by providing a pair of spaced high pressure lubrication points in each of the longitudinal grooves. The longitudinal grooves being at right angles to the relative movement of the shaft 13 journaled in the bearing, wearing influence is not concentrated as by circumscribing grooves and shaving effect is minimized. Bearings constructed as described have been found to have increased life, more effectively withstanding weights and inertia of members journaled therein. Clogging of the grooves is minimized, wear is reduced, and desired lubricating pressure is maintained without difficulty. The bearing is simple, durable, and economical to construct.

Although we have herein shown and described our invention in what we have conceived to be the most practical and preferred embodiment, it is recognized that departures may be made therefrom within the scope of our invention, which is not to be limited to the details disclosed herein, but is to be accorded the full scope of the claims so as to embrace any and all equivalent devices.

Having described our invention, what we claim as new and desire to secure by Letters Patent is:

1. A journal bearing, adapted to be mounted in a pillow block having a conduit as a part thereof in fluid communication with a source of lubricant under pressure, comprising a substantially cylindrical bushing having a coaxial bore therethrough, a radial projection at each end of the bushing; said bushing having longitudinal parallel channels formed inwardly disposed therein relative to the bore intermediate the ends of the bushing and substantially equally spaced from each other, said bushing having endless circumscribing channels formed in its periphery between the radial projections, apertures formed through the bushing providing communication between each end of each longitudinal channel and a circumscribing channel, and having lubrication feed grooves formed therein interconnecting the circumscribing grooves of the bushing.

2. A bearing, adapted to be mounted in a cylindrical opening of a pillow block and lubricated by lubricant under pressure fed to the cylindrical opening, comprising a cylindrical member having an external diameter to fit closely in the cylindrical opening in the pillow block, the cylindrical member having a radial projection at each end thereof to engage and seal against the ends of the pillow block, the cylindrical member being adapted rotatably to receive a shaft axially therethrough in its inner diameter, having a groove formed longitudinally along the inner diameter of the cylindrical member intermediate the ends thereof, a pair of circumferential grooves formed inwardly in the outer diameter of the cylindrical member spaced from the radial projection at each end thereof, each axially coincident with one end of the longitudinal grooves, a passage between the ends of each longitudinal groove and the respective circumferential groove, and a feed groove formed longitudinally in the outer diameter of the cylindrical member communicating between the circumferential grooves, the feed groove being adapted to register with the lubricant under pressure in the pillow block.

CECIL O. GORDON.
HARRY W. TASH.
RUPERT FRANKLIN.
HENRY HAFFNER.

REFERENCES CITED

The following references are of record in the file of this patent:

UNITED STATES PATENTS

| Number | Name | Date |
| --- | --- | --- |
| 429,507 | Conradson | June 3, 1890 |
| 763,409 | Lind | June 28, 1904 |
| 1,631,962 | Hemleb | June 14, 1927 |
| 2,004,254 | Taub | June 11, 1935 |
| 2,163,090 | Harry | June 20, 1939 |
| 2,203,039 | Aker | June 4, 1940 |